US008432880B2

(12) United States Patent
Dewasurendra et al.

(10) Patent No.: US 8,432,880 B2
(45) Date of Patent: Apr. 30, 2013

(54) METHOD FOR GROUP CALL COMMUNICATION (75) Inventors: Duminda A. Dewasurendra, Plantation, FL (US); Mahes M. Ekanayake, Davie, FL (US); Wayne M. Phang, Coral Springs, FL (US)

(73) Assignee: Motorola Solutions, Inc., Schaumburg, IL (US)

( * ) Notice: Subject to any disclaimer, the term of this patent is extended or adjusted under 35 U.S.C. 154(b) by 382 days.

(21) Appl. No.: 12/533,200

(22) Filed: Jul. 31, 2009

(65) Prior Publication Data

US 2011/0028140 A1 Feb. 3, 2011

(51) Int. Cl.
*H04W 4/00* (2009.01)
*H04B 7/15* (2006.01)

(52) U.S. Cl.
USPC .............. 370/338; 455/11.1; 455/422.1

(58) Field of Classification Search .................. None
See application file for complete search history.

(56) References Cited

U.S. PATENT DOCUMENTS

| 5,845,196 | A | * | 12/1998 | Nawata | 455/71 |
| 5,887,265 | A | | 3/1999 | Tang et al. | |
| 5,983,072 | A | * | 11/1999 | Schroderus | 455/11.1 |
| 6,226,524 | B1 | | 5/2001 | Allen et al. | |
| 7,230,977 | B1 | * | 6/2007 | Somekh et al. | 375/211 |
| 2002/0145968 | A1 | * | 10/2002 | Zhang et al. | 370/206 |
| 2006/0083216 | A1 | * | 4/2006 | Kwack | 370/351 |
| 2006/0165035 | A1 | | 7/2006 | Chandra et al. | |
| 2011/0028140 | A1 | * | 2/2011 | Dewasurendra et al. | 455/422.1 |

FOREIGN PATENT DOCUMENTS

| KR | 10-2008-0067092 A | 7/2008 |
| KR | 10-2008-0099701 A | 11/2008 |
| WO | 2007056103 A1 | 5/2007 |

OTHER PUBLICATIONS

PCT International Search Report Dated Feb. 28, 2011.
U.S. Appl. No. 12/325,640, filed Dec. 1, 2008.
PCT International Preliminary Report on Patentability Dated Jan. 31, 2012 for Counterpart Application PCT/US2010/039727.

* cited by examiner

*Primary Examiner* — Xavier S. Wong
*Assistant Examiner* — Leon Andrews
(74) *Attorney, Agent, or Firm* — Randi L. Karpinia; Daniel R. Bestor (57) ABSTRACT A method for communicating a group call within a communication network comprising at least one repeater and a plurality of communication devices includes: receiving at least one preamble slot and at least one synchronization slot from an originator communication device by the repeater and a communication device; operating the communication device to receive one or more calls directly from the originator device via eavesdropping on the repeater uplink channel when a received signal strength indication (RSSI) of the direct preamble and synchronization slots is greater than a threshold; and operating the communication device to receive one or more calls from the originator device via the repeater on a repeater downlink channel of the repeater when the direct RSSI is not greater than the threshold.

17 Claims, 4 Drawing Sheets

PRIOR ART

FIG. 1

PRIOR ART

FIG. 2

PRIOR ART

METHOD FOR GROUP CALL COMMUNICATION

FIELD OF THE DISCLOSURE

The present disclosure relates generally to wireless communication systems and more particularly to group call communications within a repeater-enabled communication system.

BACKGROUND

Radio communication provides for information to be modulated onto channels corresponding to carrier frequencies of the radio frequency band. Such information is then transmitted and received on the channels by radios that are within communication range of each other. This communication range can be extended by using what is commonly known as repeaters to receive and re-transmit the information to other radios. When radios communicate via a repeater, a transmitting radio transmits information on a channel to the repeater. The repeater receives this information and then re-transmits the information to other radios on a different channel.

Figure 1:
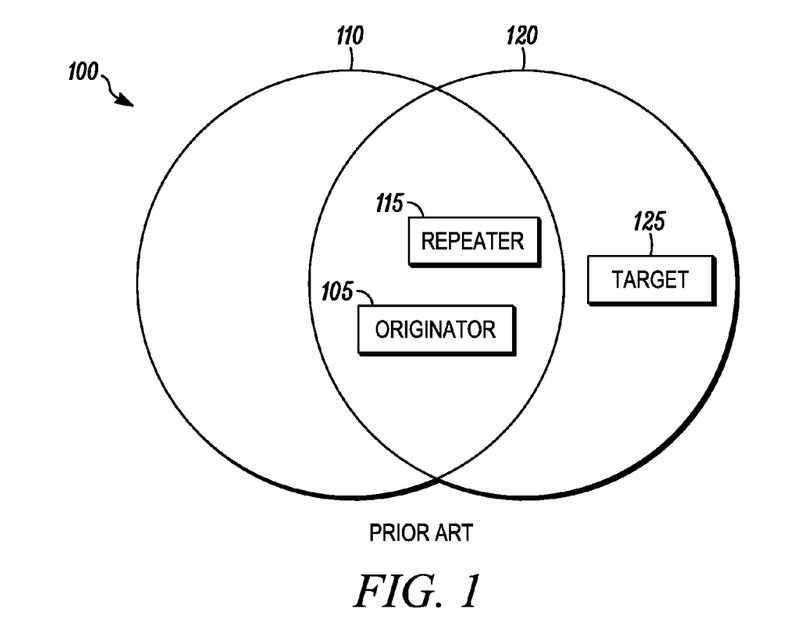
FIGS. 1, 2, and 3 are block diagrams of various wireless communication systems.

For example, as illustrated in FIG. 1, an originator 105 in a communication network 100 can communicate with a target 125 outside the communication range 110 of the originator 105 when the target 125 is within a communication range 120 of a repeater 115 that is within the communication range 110 of the originator 105. In other words, the target 125 would otherwise not be reachable directly by the originator 105.

It will be appreciated by those of ordinary skill in the art that the repeater has a slightly increased range compared to individual radios due to its elevated, high gain antenna and its central location. However, this increased coverage is not due to high transmit (Tx) power, as the repeater Tx power is same as radio Tx power due to regulatory requirements.

A repeater cannot be used when radios are not within communication range of the repeater or when channels used by the repeater are not available for relaying information by receiving and re-transmitting. When the repeater cannot be used for relaying information, direct communication between radios may still be possible. However, such radios need to be within the communication range of each other. Direct communication without using repeaters is known in the art as talkaround.

In digital two-way radio communication systems, two types of calls are present: Private calls (from one radio to another) and Group calls (from one radio to many radios). In systems such as described in U.S. patent application Ser. No. 12/325,640 to Dewasurendra et al entitled "Method And Apparatus For Establishing A Call In A Digital Radio Communication System," filed Dec. 1, 2008, and assigned to the assignee of the present invention, in a group call scenario, the strategy is to always transmit the call through the repeater, based on the assumption that the repeater has slightly better coverage (increased range) compared to direct transmission from the originator, and hence the call will be received by more target radios in the intended group.

Figure 2:
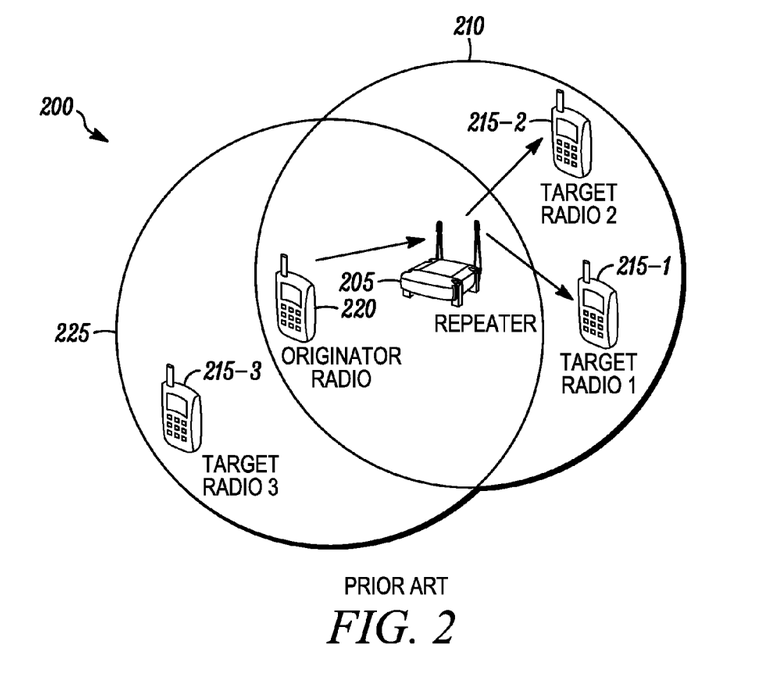

When a group call is transmitted through the repeater, the originator transmits the call in the uplink channel to the repeater and the repeater retransmits it in the downlink channel. FIG. 2 illustrates an outdoor scenario 200 and FIG. 3 illustrates an indoor scenario 300 in a typical network.

As illustrated in FIG. 2, in the outdoor scenario 200, when originator radio 220 transmits a call to the repeater 205 which is within the coverage area 225 of the originator radio 220, target radios 215-1 and 215-2 will receive a downlink transmission from repeater 205 because they are both located within the repeater coverage area 210. However, target radio 215-3 will not receive the repeater downlink transmission since it is not in the repeater coverage region 210, and hence will miss the call.

Figure 3:
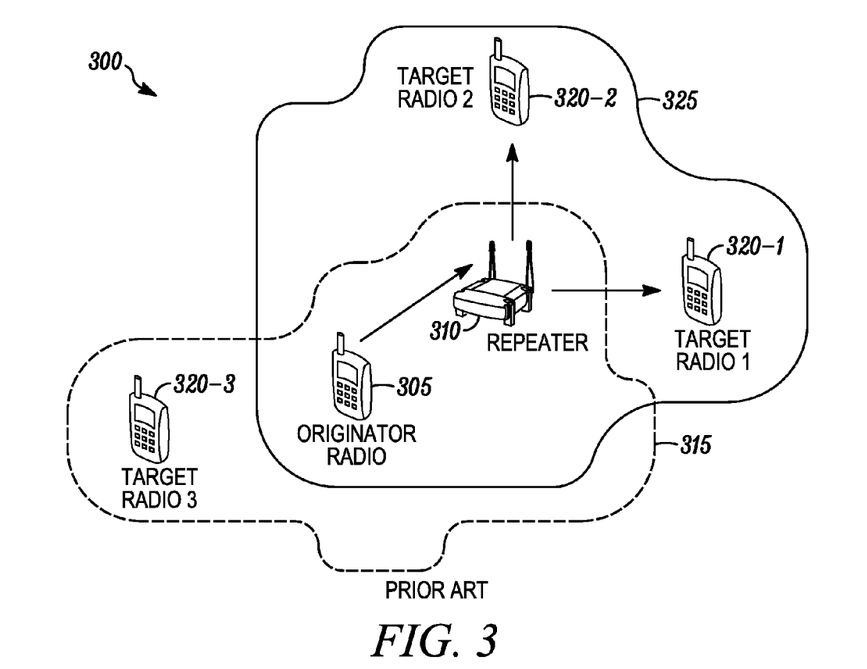

As illustrated in FIG. 3, the problem is more pertinent to indoor scenarios where the coverage regions are mostly irregular in shape. In indoor scenarios, some targets may miss the call going through the repeater even when it is located in close proximity to the originator radio. In the indoor scenario 300, when originator radio 305 transmits a call to the repeater 310 which is within the coverage area 315 of the originator radio 305, target radios 320-1 and 320-2 will receive a downlink transmission from repeater 310 because they are both located within the repeater coverage area 325. However, target radio 320-3 will not receive the repeater downlink transmission since it is not in the repeater coverage region 325, and hence will miss the call.

Accordingly, there is a need for a method and apparatus for enhanced group call communication quality within a repeater-enabled communication system.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

In accordance with some embodiments presented herein, method for communicating a group call within a communication network comprising at least one repeater and a plurality of communication devices includes: receiving at least one preamble slot and at least one synchronization slot from an originator communication device by a communication device; operating the communication device to receive one or more calls directly from the originator device when a received signal strength indication (RSSI) of the preamble and synchronization slots is greater than a threshold; and operating the communication device to receive one or more calls from the originator device via the repeater on a repeater downlink channel of the repeater when the RSSI is not greater than the threshold.

Wireless communication systems utilizing repeaters include digital systems which use asynchronous frequency hopping methods. In asynchronous, frequency hopping, digital systems, both the frequency hopping channel and the slot timing sequence for the uplink and downlink transmissions are different. As illustrated in FIGS. 2 and 3 previously herein, the target radio may miss the uplink transmission and hence the chance to receive the call directly from the originator, although it is in direct range of the originator.

In asynchronous digital two-way radio systems, the radios are not synchronized to each other or to any infrastructure, in time or frequency. In typical operation, a target radio obtains both time and frequency synchronization information from the originator radio at the beginning of each call. The radios then communicate using frequency hopping in license-free bands, such as the Industrial, Scientific and Medical (ISM) radio bands. In such systems, the radios connect in a direct talk-around mode as long as the originator and the target are within range of each other. No other infrastructure is required to support the operation of the radios in this mode as long as the radios remain within range of each other.

The range of communication in such radio systems is increased by introducing a repeater. The repeater unit may act only in an on-demand fashion and does not affect the default asynchronous operation of the radios in the TalkAround mode. An originator radio connects to the target radio via the repeater only when the direct talk-around mode is not possible due to range limitations. In such systems, to relay a call that cannot otherwise be completed in the direct talk-around mode, the repeater also has to acquire time and frequency synchronization information from the originator radio. Following receipt of the information, the repeater has to send new time and frequency information to the target.

The embodiments of the present invention described herein will be described mainly for asynchronous, frequency hopping, digital systems.

It will be appreciated by those of ordinary skill in the art that in analog systems, the same issue can occur since the target radios are tuned to receive the downlink frequency of the repeater. Hence, a target radio may not receive the originator uplink transmission, although the target radio is in the direct range of the originator.

The present invention provides a method of allowing the target radios to eavesdrop the uplink communication between the originator and the repeater. By doing this, targets that are not in the repeater coverage region, but are in the direct coverage region of the originator are enabled to also receive the call. In effect, this makes the overall call coverage region equal to the union of the two coverage regions shown in FIGS. 2 and 3. It has been noted via experimentation that the coverage improvement using this method can be as high as forty percent (40%) in certain indoor scenarios. To allow such eavesdropping, a communication protocol between the originator, the repeater and the target is as described herein below.

Figure 4:
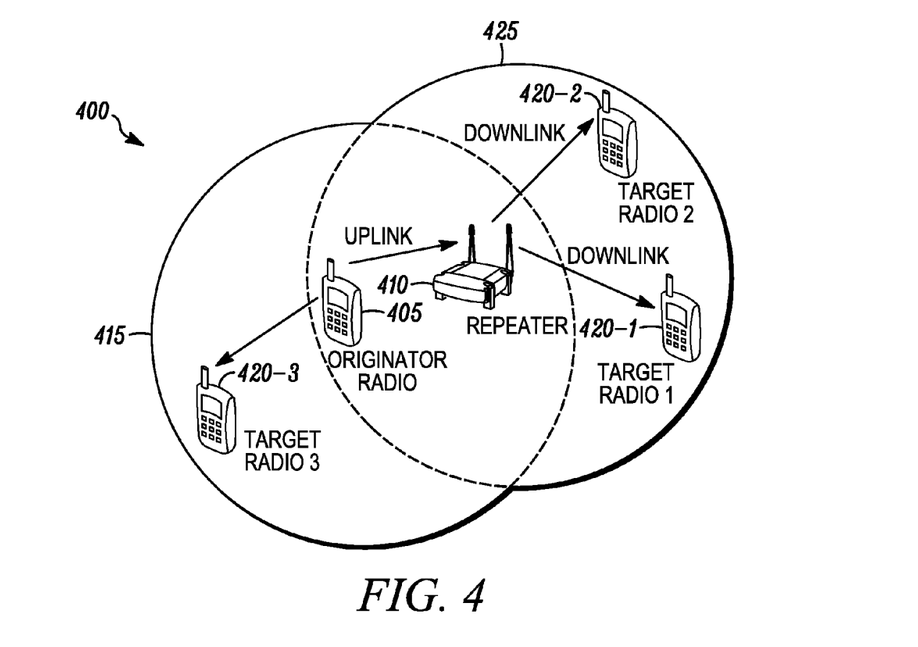
FIG. 4 is a block diagram of a wireless communication system in accordance with some embodiments.

As illustrated in FIG. 4, In a wireless communication system 400 implementing embodiments of the present invention, when originator radio 405 transmits a call to the repeater 410 which is within the coverage area 415 of the originator radio 405, target radios 420-1 and 420-2 will receive a downlink transmission from repeater 410 because they are both located within the repeater coverage area 425. However, target radio 420-3 will not receive the repeater downlink transmission since it is not in the repeater coverage region 425. In accordance with some embodiments, target radio 420-3 will receive the call via eavesdropping to uplink. Therefore, the overall coverage region for the originator radio is the union of both the repeater coverage area 425 and the originator coverage area 415.

Figure 5:
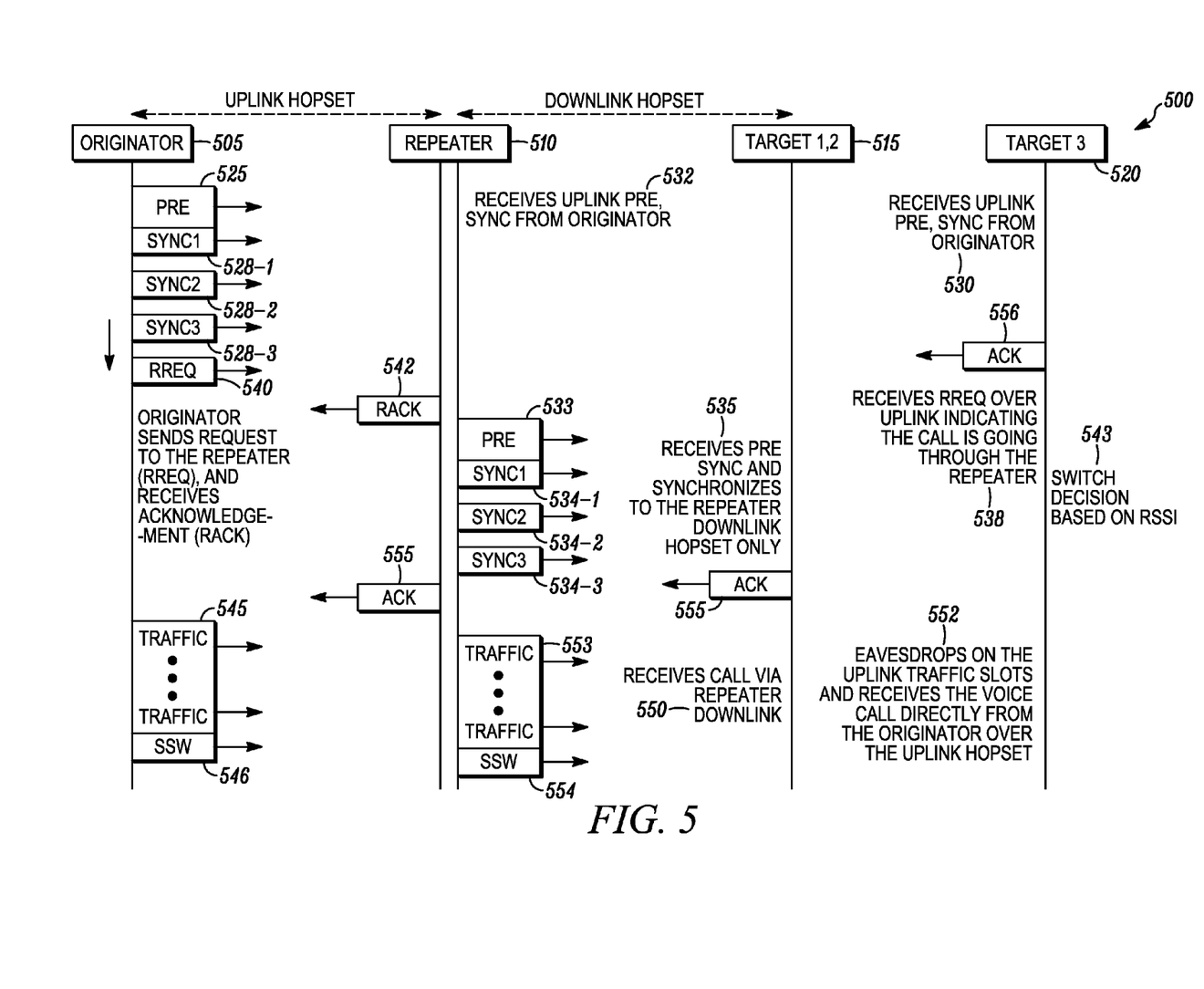
FIG. 5 is a messaging diagram illustrating various communications within a wireless communication system in accordance with some embodiments.

FIG. 5 is a messaging diagram 500 illustrating various communications within a wireless communication system in accordance with some embodiments. As illustrated in FIG. 5, an originator radio 505 initiates a call by sending preamble slots PRE 525 in the uplink hopset. Preamble slots PRE 525 wake up receivers and provide initial, preliminary time and frequency synchronization information. Following the preamble (PRE) slots 525, the originator radio 505 sends synchronization (SYNC) slots. In one embodiment, as illustrated, the originator radio 505 transmits three synchronization slots (SYNC1 528-1, SYNC2 528-2, SYNC3 528-3). The SYNC slots (SYNC1 528-1, SYNC2 528-2, SYNC3 528-3) provide exact time and frequency hopping synchronization as well as call content information including target radio identification (ID) with blanks in between. The blanks, in one embodiment, comprise ninety (90) millisecond (ms) blanks.

The time and frequency synchronization information transmitted in the PRE 525 and SYNC 528 slots by the originator radio 505 are captured by both repeaters and target radios in direct range of the originator radio 505. For example, in FIG. 5, repeater 510 and target radio 3 520 receives the PRE slots 525 and SYNC slots 528 directly from the originator radio 505.

In one embodiment, the channels referred herein are hopsets of fifty (50) frequencies each. A hop seed value sent initially inside the SYNC slots are used to generate a pseudorandom hopping sequence used for transmitting and receiving the following acknowledgement (ACK), traffic (TCH), and super stop waveform (SSW) slots. The hopseeds used by the uplink and the downlink are different, and they are also updated after each call.

Acknowledgement (ACK) slots are initiated by the target radio to indicate acknowledgment of the PRE and SYN slots. In a private call, this ACK need to be received by the originator before continuing the call beyond the PRE and SYNC. In a group call, regardless of ACK 556 from target 520 in its range, the originator 505 always routes the call via the repeater 510.

Traffic (TCH) slots are slots containing the forward error correction (FEC) coded voice bits.

Super stop waveform (SSW) slots are slots that are used to indicate the termination of a call.

PRE slots 525 and SYNC slots 528 are placed at known frequencies. For other slot types, information is often repeated in multiple slots at different frequencies to ensure frequency diversity, achieving robustness against fading conditions. The frequencies used to transmit these slots are drawn from a pseudorandom pattern generated based on the hopseed.

Uplink channels are used by default by the originator 505 to send the PRE slots 525 and SYNC slots 528, in order to allow both repeaters and targets in its range to receive the initial synchronization information, thereby reducing the call connection delay of private calls.

In the message diagram scenario 500 of FIG. 5, Targets 1 and 2 (515) are in direct range of the repeater 510 but not in direct range of the originator 505. Target 3 520 is in the direct range of the originator 505.

Since Target 3 520 is in the direct range of the originator 505, it will synchronize itself using PRE slots 525 and SYNC slots 528 to receive the subsequent slots (operation 530). Targets 1 and 2 (515) on the other hand do not receive this PRE slots 525 and SYNC slots 528 since they are not in direct range of the originator 505.

In the messaging diagram scenario 500 of FIG. 5, repeater 510 is also within the direct range of the originator 505. If it is not engaged in another call, the uplink side of the repeater 510 will also synchronize itself to the originator 505 using the same PRE slots 525 and SYNC slots 528 (operation 532).

After synchronization, the repeater 510 transmits the PRE slots 533 and the SYNC slots 534. Targets 1 and 2 (515) not in direct range of the originator 505 then receive the PRE slots 533 and SYNC slots 534 from the repeater 510 and synchronize to the repeater downlink channel only (operation 535). It will be appreciated by those of ordinary skill in the art that target radio 3 520 may or may not receive the PRE slots 533 and SYNC slots 534 from the repeater 510.

In a group call, the originator radio 505 transmits a repeater request (RREQ) 540 to relay the group call to the repeater 510. In response, the repeater 510 transmits a request acknowledgement RACK 542 to the originator radio 505.

Target radio 3 520, being in direct communication with the originator radio 505, also receives the RREQ 540 at the end of SYNC 528. By receiving the RREQ 540, target radio 3 520 determines that this group call will be routed via the repeater 510 (operation 538). In conventional systems, target radio 3 520 would then switch itself to receive on the repeater downlink channel.

In accordance with some embodiments, (not shown) instead of always switching to the repeater downlink channel when the call is going through the repeater 510, Target radio 3 520 makes that decision based on the received signal strength indication (RSSI) of the PRE slots 525 and SYNC slots 528 received directly from the originator 505 (operation 543). When the direct RSSI is higher than a certain threshold, target 3 520 will decide to eavesdrop on the uplink channel and obtain the traffic slots.

As illustrated in FIG. 5, the originator radio 505 continues the call by transmitting voice and/or data traffic 545 and super stop waveforms SSW 546 on its uplink channel.

When this initial RSSI of direct slots from originator 505 is above the threshold, Target radio 3 520 eavesdrops on the uplink traffic slots and receives the call directly from the originator radio 505 including the traffic 545 (operation 552), and the SSW slots 546.

The repeater 510, upon receiving the call traffic 545 and the SSW slots 546, transmits the traffic 553, and the SSW slots 554 on its downlink channel. Target radios 1 and 2 515 receive the call including the traffic 553, and the SSW slots 554 via the repeater downlink (operation 550). Target radios 1 and 2 515 then transmit an acknowledgement message ACK 555 which is relayed via the repeater 510 to the originator radio 505.

When the initial RSSI of direct slots from the originator radio 505 is below the threshold (indicating fringe conditions, with the possibility of dropping a call in the middle of the conversation), target radio 3 520 will immediately start scanning for the repeater downlink channel, expecting to and receiving the call including the traffic 553, and the SSW slots 554 via the repeater 510, presumably with a better RSSI (not shown).

The operation of FIG. 5, therefore, provides a method for a radio to make a decision for a call to be communicated via a repeater or alternatively via a talk around mode without the presence of any central controller or base station to assist in channel selection and the like.

Figure 6:
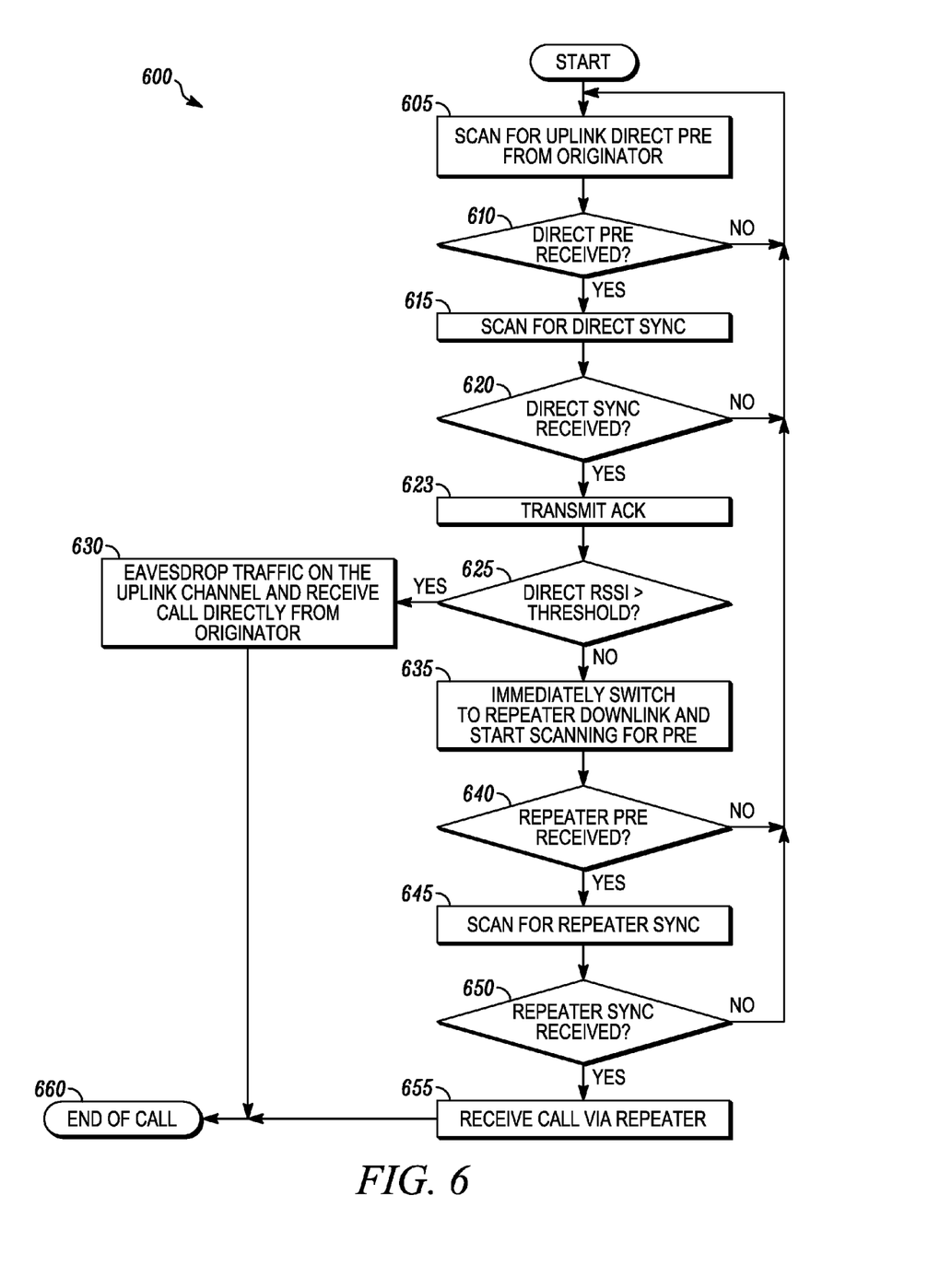
FIG. 6 is a flowchart illustrating a method of operating a target radio within a wireless communication system in accordance with some embodiments.

FIG. 6 is a flowchart illustrating a method of operation 600 of a target in direct range of an originator in accordance with some embodiments. The method of operation 600 of FIG. 6 can be utilized to operate Target 3 520 of FIG. 5.

As illustrated in FIG. 6, the operation 600 begins with the target scanning for an uplink direct PRE from the originator. Next, in Step 610, the operation determines whether or not a direct PRE has been received. When no direct PRE is received, the operation cycles back to Step 605 with the target scanning the uplink. When a direct PRE has been received in Step 610, the operation continues to Step 615 in which the target scans for direct SYNC from the originator on the uplink. Next in Step 620, the operation determines whether or not a direct SYNC has been received. When no SYNC slots have been received directly from the originator, the operation cycles back to Step 605 with the target scanning the uplink. When SYNC has been received directly from the originator, ACK is transmitted (Step 623) and the operation continues to Step 625 in which it is determined whether or not the RSSI of the slots received directly from the originator is greater than a threshold. When the RSSI is greater than the threshold, the operation continues to Step 630 in which the target eavesdrops on traffic on the uplink channel and receives calls directly from the originator. Thereafter, in Step 660, the call ends.

When the direct RSSI is less than the threshold, the operation continues to Step 635 in which the target immediately switches to the repeater downlink and starts scanning for repeater downlink PRE slots. Next, in Step 640, it is determined whether or not a repeater PRE slot has been received. When no repeater PRE slots are received, the operation cycles back to Step 605 scanning the uplink. When repeater PRE slots are received, the operation continues to step 645 in which the target scans the repeater downlink for repeater SYNC slots. Next, in Step 650, it is determined whether or not repeater SYNC slots have been received. When no repeater SYNC slots are received, the operation cycles back to Step 605 and the target scans the uplink. When repeater SYNC slots have been received, the operation continues to Step 655 and the target receive the call via the repeater. Thereafter, in Step 660, the call ends.

In another embodiment, a target in direct range of an originator, after saving time and frequency synchronization information initially received from the originator in the uplink channel PRE and SYNC, and also the RSSI of this uplink PRE and SYNC, will scan for the PRE of the repeater downlink channel between Operations 538 and 540 of FIG. 5.

Once the downlink PRE is received, the target compares this downlink RSSI to the previously saved uplink RSSI. Based on this comparison it decides the next sequence of actions.

(a) When the direct uplink RSSI is higher, revert to eavesdropping of traffic of the repeater uplink channel and receive the voice call directly from the originator.

(b) When the Downlink PRE RSSI is higher, discontinue listening to the direct uplink channel and immediately synchronize itself to the repeater downlink channel to receive the call via repeater.

Depending on the choice of (a) or (b), the target has to also decide the exact time to start the call decoding process and also the time to unmute the speaker.

In this embodiment, in FIG. 5. if the RACK 542 is not received by the originator during a group call indicating that the repeater is not available to relay the group call at this time, the originator notices that at least one target 520 included in the group is available in its direct range (indicated by the receipt of ACK 556). In this case, the originator may choose to continue transmitting the call as if the repeater is present, allowing the target 520 to receive the call including the traffic 545 (operation 552), and the SSW slots 546.

As described herein, embodiments of the present invention provide target radios with the ability to eavesdrop on the uplink communication between the originator and the repeater and receive calls accordingly.

As further described herein in an alternate embodiment, the present invention saves time and frequency synchronization information of the uplink, then scans for repeater downlink signals, and switches to the repeater downlink channel only if it guarantees better call quality.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for improving repeater-enabled group call coverage within a wireless communication network comprising at least an originator wireless communication device, a repeater device, and a plurality of target wireless communication devices, the method comprising:

eavesdropping, by at least a particular one of the plurality of target wireless communication devices, on a wireless uplink channel between the at least one originator wireless communication device of a repeater-enabled group call and the repeater device and receiving at least one preamble slot, at least one synchronization slot, and at least one repeater request directly from the originator wireless communication device via the eavesdropped wireless uplink channel, wherein the particular target wireless communication device is within a wireless transmission range of the originator wireless communication device, thereby increasing a wireless coverage area of the repeater-enabled group call to a union of a coverage area of the repeater device and a coverage area of the originator wireless communication device;

determining, by the particular target wireless communication device, whether a direct received signal strength indication (RSSI) of signals received directly from the originator wireless communication device via the eavesdropped wireless uplink channel is greater than a threshold;

operating the particular target wireless communication device to receive the repeater-enabled group call directly from the originator wireless communication device via the eavesdropped wireless uplink channel, instead of on a repeater downlink channel of the repeater device where the repeater-enabled group call will also be made available by the repeater device, when the determining is that the direct RSSI of the signals received directly from the originator wireless communication device is greater than the threshold; and operating the particular target wireless communication device to receive the repeater-enabled group call from the originator wireless communication device via the repeater device on the repeater downlink channel of the repeater device, instead of directly from the originator wireless communication device via the eavesdropped wireless uplink channel, when the determining is that the direct RSSI signals received directly from the originator wireless communication device is not greater than the threshold.

2. The method of claim 1, further comprising prior to the receiving of the at least one preamble slot and the at least one synchronization slot:

initiating the repeater-enabled group call by the originator wireless communication device sending the at least one preamble slot and the at least one synchronization slots in an uplink hopset.

3. The method of claim 1, wherein the at least one preamble slot and the at least one synchronization slot include time and frequency synchronization information.

4. The method of claim 1, further comprising:

additionally receiving, by the particular target wireless communication device, retransmissions of the at least one preamble slot and the at least one synchronization slot from the repeater device on the repeater downlink channel of the repeater device.

5. The method of claim 4, wherein the repeater device is in direct communication range of the originator wireless communication device.

6. The method of claim 4, further comprising:

operating the repeater device and the particular target wireless communication device to each synchronize themselves using the received at least one preamble slot and the at least one synchronization slot.

7. The method of claim 6, wherein the determining is that the direct RSSI of the preamble and synchronization slots is greater than the threshold, the method further comprising:

operating the repeater device to retransmit the at least one preamble slot and the at least one synchronization slot on the repeater downlink channel;

receiving, by at least one other target wireless communication device of the plurality of target wireless communication devices in a coverage area of the repeater device, the at least one preamble slot and the at least one synchronization slot retransmitted on the repeater downlink channel; and operating the at least one other target wireless communication device to receive the repeater-enabled group call from the originator wireless communication device via the repeater device on the repeater downlink channel wherein the determining, by the particular target wireless communication device, is that the direct RSSI of the signals received directly from the originator wireless communication device is greater than the threshold and the particular target wireless communication device is operated to receive the repeater-enabled group call directly from the originator wireless communication device instead of on the repeater downlink channel.

8. The method of claim 7, further comprising:

operating the at least one other target wireless communication device to synchronize to the repeater downlink channel of the repeater device in response to receiving the at least one preamble slot and the at least one synchronization slot retransmitted on the repeater downlink channel.

9. The method of claim 1, further comprising:

transmitting a repeater request acknowledgement from the repeater device to the originator wireless communication device in response to receiving the at least one repeater request.

10. The method of claim 1, further comprising:

transmitting the repeater-enabled group call on the wireless uplink channel by the originator wireless communication device.

11. The method of claim 10, further comprising: operating the repeater device to retransmit the repeater-enabled group call on the repeater downlink channel.

12. A method for improving repeater-enabled group call coverage within a wireless communication network comprising at least an originator wireless communication device, a repeater device, and a plurality of target wireless communication devices, the method comprising:

eavesdropping, by at least a particular one of the plurality of target wireless communication devices, on a wireless uplink channel between the at least one originator wireless communication device and the repeater device of a repeater-enabled group call and receiving at least one preamble slot, at least one synchronization slot, and at least one repeater request directly from the originator wireless communication device via the eavesdropped wireless uplink channel, wherein the particular target wireless communication device and the repeater device are within a wireless transmission range of the originator wireless communication device, thereby increasing a wireless coverage area of the repeater-enabled group call to a union of a coverage area of the repeater device and a coverage area of the originator wireless communication device;

receiving, by the particular target wireless communication device, retransmitted ones of the at least one preamble slot and the at least one synchronization slot by from the repeater device on a downlink channel of the repeater device;

comparing, by the particular target wireless communication device, an uplink direct received signal strength indication (RSSI) of the wireless uplink channel from the originator wireless communication device to the repeater device, to an indirect downlink RSSI of the downlink channel from the repeater device;

operating the particular target wireless communication device to receive the repeater-enabled group call directly from the originator wireless communication device via the eavesdropped wireless uplink channel, instead of on a repeater downlink channel of the repeater device where the repeater-enabled group call will also be made available by the repeater device, when the uplink RSSI is greater than the downlink RSSI; and operating the particular communication device to receive the repeater-enabled group call from the originator wireless communication device via the repeater on the downlink channel of the repeater device, instead of directly from the originator wireless communication device via the eavesdropped wireless uplink channel, when the uplink RSSI is not greater than the downlink RSSI.

13. The method of claim 12, wherein the uplink RSSI is greater than the downlink RSSI, the method further comprising:

receiving, by at least one other target wireless communication device in a coverage area of the repeater device, the at least one preamble slot and the at least one synchronization slot retransmitted on the repeater downlink channel; and operating the at least one other target wireless communication device to receive the repeater-enabled group call from the originator wireless communication device via the repeater device on the repeater downlink channel;

wherein the determining, by the particular target wireless communication device, is that the uplink RSSI is greater than the downlink RSSI and the particular target wireless communication device is operated to receive the repeater-enabled group call directly from the originator wireless communication device instead of on the repeater downlink channel.

14. The method of claim 13, further comprising:
transmitting the repeater-enabled group call on the wireless uplink channel by the originator wireless communication device.

15. The method of claim 14, further comprising: operating the repeater device to retransmit the repeater-enabled group call on the repeater downlink channel.

16. The method of claim 13, wherein the at least one preamble slot and the at least one synchronization slot include time and frequency synchronization information.

17. The method of claim 1, wherein the determining, by the particular target wireless communication device, whether the direct RSSI of signals received directly from the originator wireless communication device is greater than a threshold is performed during one of the reception of the preamble and synchronization slots.

* * * * *